(12) United States Patent
Chen et al.

(10) Patent No.: US 10,742,134 B2
(45) Date of Patent: Aug. 11, 2020

(54) ISOLATED CAPACITIVE POWER TRANSFER

(71) Applicant: TEXAS INSTRUMENTS INCORPORATED, Dallas, TX (US)

(72) Inventors: Lei Chen, Dallas, TX (US); Rajarshi Mukhopadhyay, Allen, TX (US); Mark W. Morgan, Allen, TX (US); Joseph A. Sankman, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/685,007

(22) Filed: Aug. 24, 2017

(65) Prior Publication Data

US 2017/0353125 A1    Dec. 7, 2017

Related U.S. Application Data

(63) Continuation of application No. 14/961,440, filed on Dec. 7, 2015, now Pat. No. 9,780,689.

(Continued)

(51) Int. Cl.
*H02M 7/217*    (2006.01)
*H02M 3/158*   (2006.01)
(Continued)

(52) U.S. Cl.
CPC ........... *H02M 7/217* (2013.01); *H02M 3/158* (2013.01); *H02M 3/28* (2013.01);
(Continued)

(58) Field of Classification Search
CPC ........ H02M 7/217; H02M 3/28; H02M 3/158; H02M 2001/123; H02M 3/33507;
(Continued)

(56) References Cited

U.S. PATENT DOCUMENTS 4,635,175 A * 1/1987 Probst .................... H02M 3/10
                                                          363/16
6,631,292 B1    10/2003 Liedtke
(Continued)

FOREIGN PATENT DOCUMENTS

CN            101641857 A      2/2010
CN            101641857 A      2/2010
(Continued)

OTHER PUBLICATIONS

Received STIC search report from EIC 2800 searcher John DiGeronimo on Dec. 22, 2017.*

(Continued)

*Primary Examiner* — Jue Zhang
*Assistant Examiner* — Htet Z Kyaw
(74) *Attorney, Agent, or Firm* — Ebby Abraham; Charles A. Brill; Frank D. Cimino

(57) ABSTRACT

A method and device for providing isolated power transfer to a low-power load across a capacitor of a series resonance circuit are shown. The method includes comparing an output voltage received via a feedback loop with a desired output voltage. Responsive to determining that the output voltage is not equal to the desired output voltage, the method determines a sub-harmonic order of the resonant frequency of the series resonance circuit to use as a switching frequency and switches the series resonance circuit at substantially the determined subharmonic order of the resonant frequency.

10 Claims, 9 Drawing Sheets

Related U.S. Application Data

(60) Provisional application No. 62/244,224, filed on Oct. 21, 2015.

(51) Int. Cl.
*H02M 3/28* (2006.01)
*H02M 1/12* (2006.01)

(52) U.S. Cl.
CPC .... *H02M 2001/123* (2013.01); *Y02B 70/1425* (2013.01); *Y02B 70/1441* (2013.01)

(58) Field of Classification Search
CPC .......... H02M 3/33515; H02M 3/33569; Y02B 70/1425; Y02B 70/1441
USPC .......................................................... 363/89
See application file for complete search history.

(56) References Cited

U.S. PATENT DOCUMENTS

| | | | | |
|---|---|---|---|---|
| 7,170,761 | B2* | 1/2007 | Yasumura | H02M 1/4241 363/17 |
| 7,412,673 | B1* | 8/2008 | Duong | G06F 17/5036 703/16 |
| 7,428,717 | B1* | 9/2008 | Duong | G01R 31/31709 716/100 |
| 7,509,608 | B1* | 3/2009 | Duong | G06F 17/5031 703/13 |
| 8,564,260 | B2 | 10/2013 | Carobolante et al. | |
| 8,564,978 | B2 | 10/2013 | Keller | |
| 9,036,372 | B2 | 5/2015 | Worek | |
| 9,124,193 | B2 | 9/2015 | Summerland et al. | |
| 9,209,674 | B2 | 12/2015 | Spinella | |
| 9,337,742 | B2* | 5/2016 | Kyono | H02M 3/33507 |
| 9,356,521 | B2* | 5/2016 | Kyono | H02M 3/33507 |
| 9,456,257 | B2 | 9/2016 | Mukhopadhyay et al. | |
| 2004/0141346 | A1* | 7/2004 | Hiratsuka | H02M 7/493 363/131 |
| 2006/0077600 | A1 | 4/2006 | Yasumura | |
| 2006/0152199 | A1* | 7/2006 | Angquist | H02J 11/00 323/208 |
| 2006/0183625 | A1 | 8/2006 | Miyahara | |
| 2007/0199385 | A1 | 8/2007 | O'Brien et al. | |
| 2008/0192509 | A1 | 8/2008 | Dhuyvetter et al. | |
| 2010/0046252 | A1 | 2/2010 | Keller | |
| 2011/0157929 | A1* | 6/2011 | Sun | H02M 5/00 363/37 |
| 2011/0254461 | A1* | 10/2011 | Summerland | H02M 7/538 315/291 |
| 2012/0153907 | A1 | 6/2012 | Carbolante et al. | |
| 2013/0314949 | A1* | 11/2013 | Chi | H02M 1/32 363/17 |
| 2014/0176086 | A1* | 6/2014 | Crewson | H02M 3/3376 320/166 |
| 2014/0225458 | A1 | 8/2014 | Rehm | |
| 2014/0354250 | A1* | 12/2014 | Deng | H02M 3/1582 323/271 |
| 2015/0054349 | A1 | 2/2015 | Ishikuro et al. | |
| 2015/0098252 | A1 | 4/2015 | Spinella | |
| 2015/0341996 | A1* | 11/2015 | Summerland | H02M 7/538 315/258 |
| 2015/0380944 | A1* | 12/2015 | Yu | H02J 50/12 307/104 |
| 2015/0381026 | A1* | 12/2015 | Tournatory | H02M 3/158 323/271 |
| 2016/0087590 | A1 | 3/2016 | Menegoli et al. | |
| 2016/0087687 | A1 | 3/2016 | Kesler et al. | |
| 2016/0226400 | A1 | 8/2016 | Boys et al. | |
| 2019/0385821 | A1* | 12/2019 | Long | H01J 37/32183 |

FOREIGN PATENT DOCUMENTS

| | | |
|---|---|---|
| CN | 101777836 A | 7/2010 |
| CN | 102439837 A | 5/2012 |
| CN | 103329419 A | 9/2013 |
| CN | 104883049 A | 9/2015 |
| WO | WO2010041067 A1 | 4/2010 |

OTHER PUBLICATIONS

Received STIC search report from EIC 2800 searcher John Digeronimo on Dec. 13, 2016.

Notification of Issuance of Office Action for PRC(China) Patent Application No. 21610920582.4; dated Oct. 16, 2019; 3 pages.

Notification of Issuance of Office Action for PRC(China) Patent Application No. 21610920582.4; dated Apr. 29, 2020; 3 pages.

Second Office Action Issued by China NationalIntellectual Property Administration; Application No. 201610920582.4; dated Apr. 23, 2020;13 pages.

* cited by examiner

ISOLATED CAPACITIVE POWER TRANSFER

CLAIM OF PRIORITY AND RELATED PATENT APPLICATIONS

This continuation application claims priority to U.S. patent application Ser. No. 14/961,440, filed Dec. 7, 2015, which application claims priority to and the benefit of U.S. Provisional Patent Application No. 62/244,224, filed Oct. 21, 2015, both of which applications are hereby incorporated by reference in their entirety.

FIELD OF THE DISCLOSURE

Disclosed embodiments relate generally to the field of power transfer. More particularly, and not by way of any limitation, the present disclosure is directed to improving the efficiency of low-power capacitive power transfer.

BACKGROUND

In industrial sensor applications, e.g., for detecting temperature or pressure, the power supply needs to be isolated from the analog front end for safety and equipment protection. The power interface mandates resilience to Common Mode Transients that can be higher than 100 KV/µs, so high-voltage isolation devices, e.g., transformers/capacitors, are necessary. In this setting, efficiency is difficult to maintain above 50% at output power ranges below 50 mW, especially when large parasitic resistance and capacitance exist on high-voltage devices. Additionally, the form factor, e.g., less than about 3×3 $mm^2$ and in some cases, less than about 2 mm wide, is critical to sensor applications such as field transmitters. However, the use of high-voltage transformers usually incurs a large area cost.

Today, most, if not all, existing choices in the isolation power market are based on transformers. Because of the large amounts of space necessary for transformer implementation, these existing choices cannot meet the above requirements for size, with several isolation power devices having dimensions ranging from 7×7 $mm^2$ to 15×15 $mm^2$. Additionally, the existing choices are not power-efficient in the low-power region, with efficiencies ranging from 10-40% at 25 mW.

SUMMARY

The present patent application discloses a method and a device for improving the efficiency of a power converter that is providing isolated power for low-power situations, e.g. 50 mW or less. Applicants note that 50 mW is not an upper limit on the use of the disclosed method. The technique has no upper limit for output power level if the tank impedance can be low enough. However, the disclosed method has more significant advantage for operation in the low power region. A resonant power converter uses a series resonance circuit that provides an output voltage across a high-voltage capacitor that is part of the series resonance circuit. A feedback circuit includes an isolated transfer of the feedback voltage from the receiver circuit to the power converter. The series resonance circuit is operated at a sub-harmonic order of the resonant frequency to improve the efficiency of the power transfer. Using the feedback, a controller selects the largest sub-harmonic order of the resonance frequency that provides the necessary power output, then tweaks one or both of the frequency and the input voltage to the series resonant circuit to achieve a desired output voltage. Both the sub-harmonic order and the input voltage can be adjusted during operation of the power converter to adjust to changing loads.

In one aspect, an embodiment of an electronic device to provide isolated capacitive power transfer to a low-power load is disclosed. The electronic device includes an inductor connected to a first terminal of a first capacitor to form a series resonance circuit that provides an alternating current (AC) voltage to a low-power load across the first capacitor; and a switching circuit connected to provide a switched voltage to the series resonance circuit at a sub-harmonic of the resonant frequency of the series resonance circuit.

In another aspect, an embodiment of a method of providing isolated power transfer to a low-power load across a capacitor of a series resonance circuit is disclosed. The method includes determining whether an output voltage received via a feedback loop is equal to a desired output voltage; responsive to determining that the output voltage is not equal to the desired output voltage, determining a sub-harmonic order of the resonant frequency of the series resonance circuit to use as a switching frequency; and switching the series resonance circuit at substantially the determined subharmonic order of the resonant frequency.

In yet another aspect, an embodiment of a method of providing isolated power transfer to a low-power load across a capacitor of a series resonance circuit is disclosed. The method includes determining whether an output voltage received via a feedback loop is equal to a desired output voltage; responsive to determining that the output voltage is not equal to the desired output voltage, determining a combination of an input voltage and a sub-harmonic order of the resonant frequency of the series resonance circuit that when used as a switching frequency will provide the desired output voltage at the greatest efficiency; and responsive to the determining, setting the input voltage to the determined value and setting the switching frequency to the determined subharmonic order of the resonant frequency.

Advantages of the disclosed operation include at least the following:
  With the use of a high-voltage capacitor, the form factor of entire isolated power transfer solution can be significantly reduced. In at least one embodiment, the chip area for the power transfer stage is reduced over 70% compared to transformer-based solutions;
  With harmonic operation, the resonant power converter can transfer power up to 15-25 mW at 60% efficiency across a functional isolated barrier of 0.5-1 kV. Power efficiency is increased by 30% compared with fundamental operation;
  By eliminating a high-voltage transformer and being able to utilize a small die area, the cost of entire solution is significantly decreased; and
  Real feedback provides adjustment to the load.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
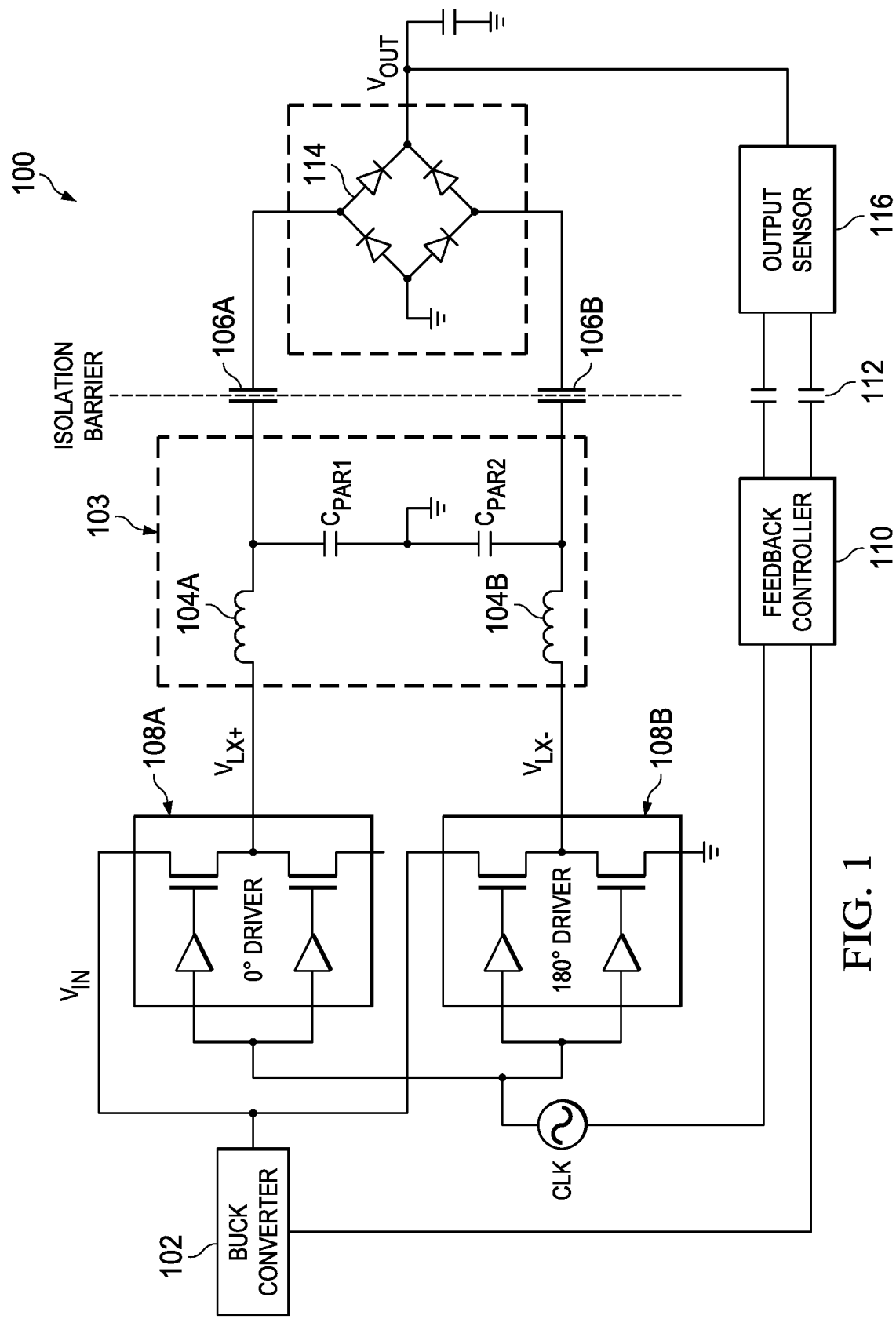
FIG. 1 depicts an example of a system for isolated power conversion according to an embodiment of the disclosure.

Referring now to the drawings and more particularly to FIG. 1, a schematic drawing of an example system 100 for power transfer across an isolation barrier is shown according to an embodiment of the disclosure. In system 100, Buck Converter 102 receives an input voltage (not specifically shown), which is stepped down to a level usable by Series Resonance Circuit 103 of the power transfer system. This stepped-down voltage $V_{IN}$ is provided as input to 0° Driver 108A and 180° Driver 108B. Drivers 108 provide switched voltage $V_{LX}$ to Series Resonance Circuit 103, which includes Inductors 104A, 104B and Capacitors 106A, 106B. Capacitors 106 provide the isolation barrier across which power is transferred. Parasitic capacitors $C_{PAR1}$, $C_{PAR2}$, are also shown in this illustration. Each of Inductors 104 is connected between a respective Driver 108 and a respective Capacitor 106 to provide an alternating current (AC) voltage across Capacitors 106. On the receiving side of the power transfer, the transferred voltage is received at Rectifier 114, which supplies a rectified voltage $V_{OUT}$ to a load (not specifically shown). The voltage level of the output is detected at Output Sensor 116 and provided to Feedback Controller 110 via Feedback Capacitor 112, which provides isolation on the feedback circuit. Feedback Controller 110 is able to adjust both the clock signal (CLK) and the voltage $V_{IN}$ that are provided to Drivers 108. In at least one embodiment of this circuit, the input voltage to Buck Converter 102 is in the range of 6-80V. In at least one embodiment, the output voltage is 3.3V and the current output ranges from 4-20 mA.

Figure 2:
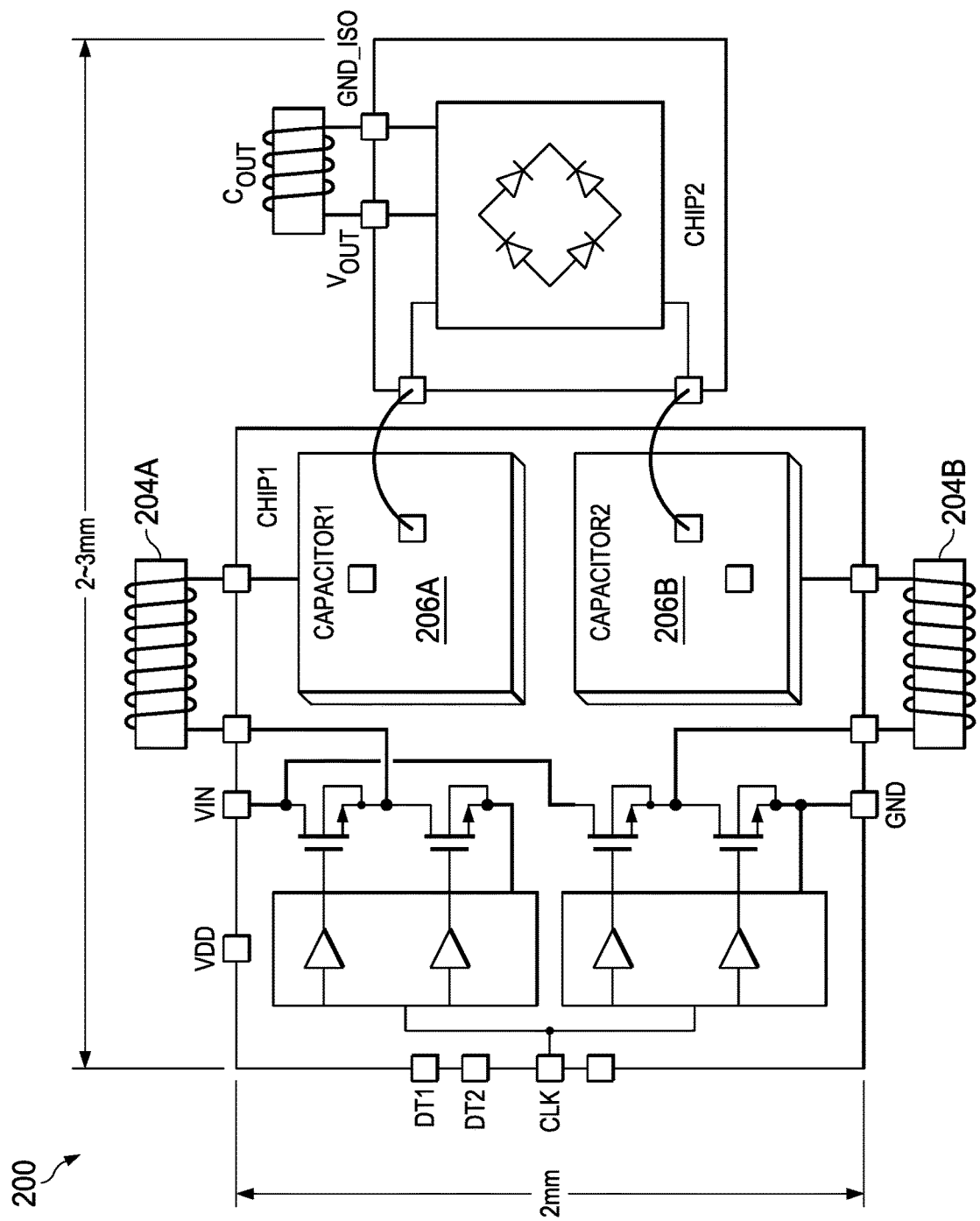
FIG. 2 depicts an example implementation of a power output stage of a system for isolated power conversion according to an embodiment of the disclosure.

FIG. 2 discloses a layout of one example of Power Transfer Circuit 200 according to an embodiment of the disclosure. This figure is given primarily to demonstrate the small size that can be accomplished using the disclosed embodiment. As seen in this figure, the circuitry for both the power transfer (Chip1) and the receiver (Chip2) are only about 2 mm×3 mm in size. Inductors 204A, 204B are external inductors that can be included in the overall package without increasing the size. External inductors are used in this embodiment for their high Q-factor; however if a sufficiently high Q-factor can be provided by an internal inductor, the disclosed device can use an internal inductor as well. In at least one embodiment, Capacitors 206 are internal capacitors. In the embodiment shown in FIG. 2, Capacitors 206 are printed capacitors that are, for example, printed above the chip passivation layer using 3D printing techniques. In at least one embodiment, Capacitors 206 have a 1 KV breakdown voltage and a capacitive density of 12.5 pF/mm², while the die area is less than 3.5 mm². The bottom plates of Capacitors 206 are connected to Inductors 204 respectively, while the top plates of these capacitors are wire bonded to input pads of Chip 2.

Figure 3A:
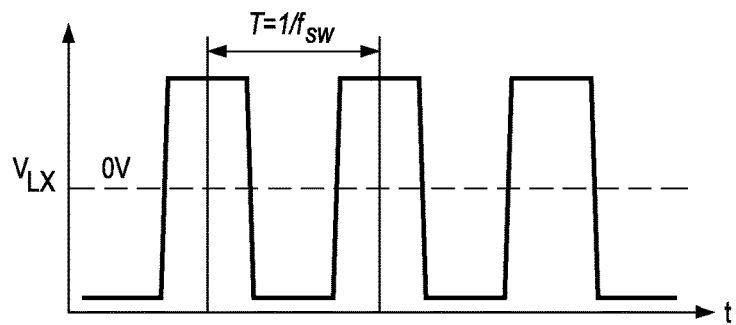
FIGS. 3A-D depict various properties of the signal of the series resonance circuit of the disclosed power output circuitry.
Figure 3B:
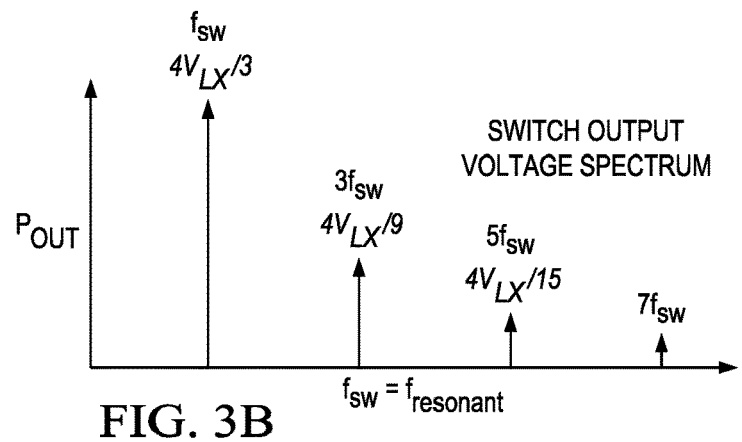
Figure 3C:
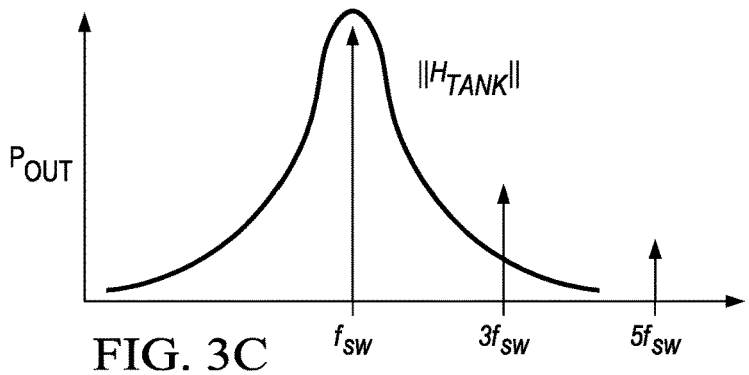
Figure 3D:
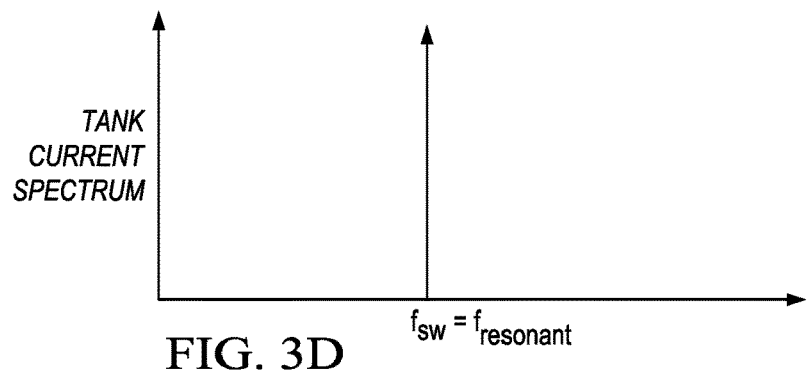

Before looking at the operation of power transfer system 100, we will quickly review some of the known factors affecting a resonant circuit. FIGS. 3A-D depict various properties of the signal $V_{LX}$ of Series Resonance Circuit 103 of FIG. 1. In FIG. 3A, we see the resonant signal $V_{LX}$ that is a summation of the two signals $V_{LX+}$ and $V_{LX-}$ from FIG. 1. $V_{LX}$ has a voltage swing from $V_{IN}$ to $-V_{IN}$ and a period that is the inverse of the switching frequency $f_{SW}$. In FIG. 3B, signal $V_{LX}$ is transformed into the frequency domain, where it can be seen that the largest component of signal $V_{LX}$ appears at the switching frequency, while smaller components are seen at the odd harmonic frequencies, e.g., $3f_{SW}$, $5f_{SW}$, $7f_{SW}$, etc. Although this figure is not drawn to scale, the power provided at $3f_{SW}$ is about one third the power at the switching frequency; the power at $5f_{SW}$ is about one-fifth the power at the switching frequency, etc. Thus, as one move to higher harmonics of the switching frequency, the maximum power available decreases. FIG. 3C illustrates a Bode plot showing the magnitude of the transfer function of the resonant circuit, which peaks at the switching frequency and drops quickly in both directions. FIG. 3D illustrates the current spectrum of the resonant circuit, which occurs only at the switching frequency. These plots illustrate that series inductor-capacitor (LC) components, such as Series Resonance Circuit 103, pass a signal at the resonance frequency and block signals of any other frequencies from getting to the load.

Figure 4:
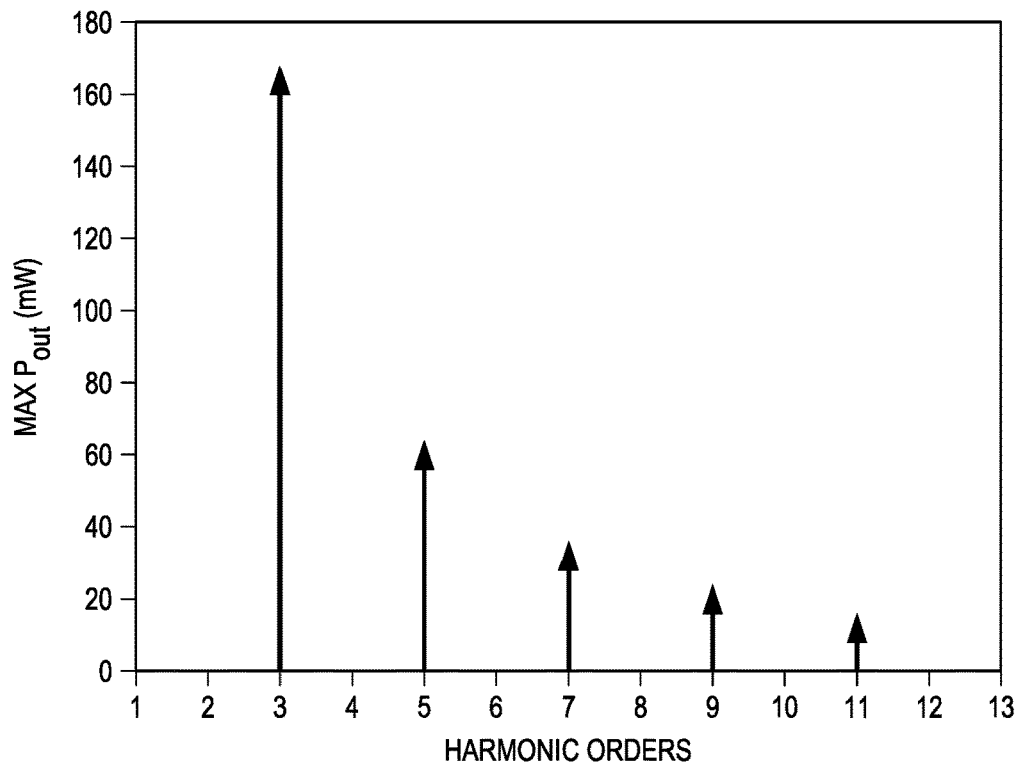
FIG. 4 depicts an the maximum output power of an example system according to an embodiment of the disclosure.

FIG. 4 shows a plot of the maximum power output $P_{OUT}$ of the circuit plotted against the harmonic order at which the power is taken. The harmonic order is a reflection of the ratio of the resonant frequency divided by the switching frequency. It can be seen that if the power is taken at the third harmonic, i.e., the switching frequency is one third of the resonant frequency, the available power for the circuit shown is a little over 160 mW. If the power is taken at the fifth harmonic, where the switching frequency is one fifth of the resonant frequency, the available power for the same circuit is around 60 mW; and if the power is taken out at the eleventh harmonic, where the switching frequency is one eleventh of the resonant frequency, the available power is around 15 mW. The question can arise why one would then want to operate the resonant circuit at anything less than the resonant frequency. Applicant has realized that although the available power drops significantly when the switching frequency is a subharmonic of the resonant frequency, the efficiency of the circuit improves significantly. Accordingly, when the power output needed is low, it can be advantageous to operate the circuit at a subharmonic frequency of the resonance frequency in order to gain efficiency in the circuit.

Figure 5A:
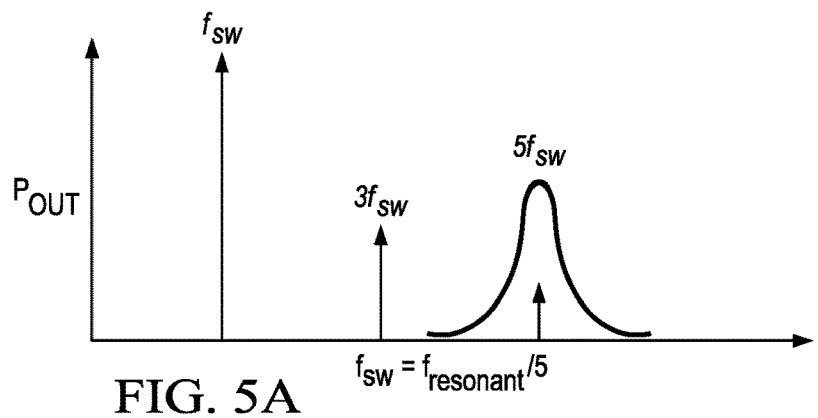
FIGS. 5A-B depict some aspects of a decision that is made to determine the switching frequency of an example system.
Figure 5B:
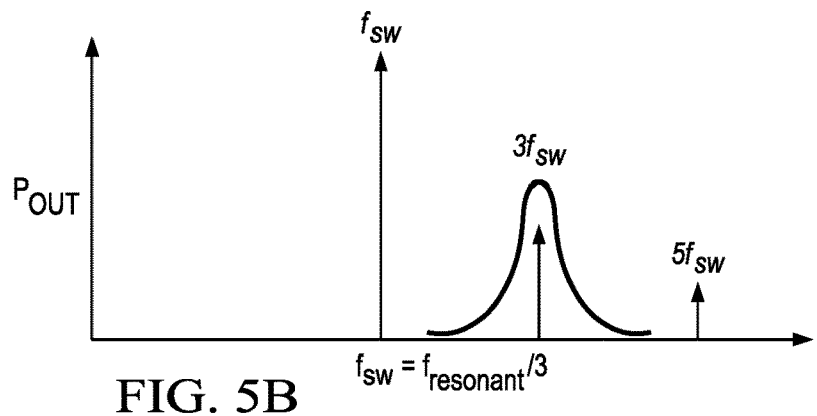

FIGS. 5A-B are used to illustrate operation of the disclosed circuit at two different sub-harmonic levels. In an example of this method of operation, a series resonance circuit is designed to have a resonant frequency $f_R$ of 30 MHz. Instead of tuning the series resonance circuit to a switching frequency $f_{SW}=f_R$, the series resonance circuit is tuned to the fifth subharmonic, giving a switching frequency of 6 MHz. The output will still be taken at $f_R$, which in this case is $5*f_{SW}$. Operation at this level will provide, in one example, 25 mW, which may be adequate for a given load. If, however, the load changes so that, for example, 50 mW is now required on the output side, represented in the drawing by the curve above $f_R$, operation at the fifth subharmonic may not be adequate. To provide for the additional power, the circuit changes the switching frequency to operate at the third sub-harmonic, which is capable of supplying the necessary output. Operation at the third harmonic is less efficient than at the fifth harmonic, as will be discussed below, but will still provide greater efficiency than previous solutions.

Figure 6A:
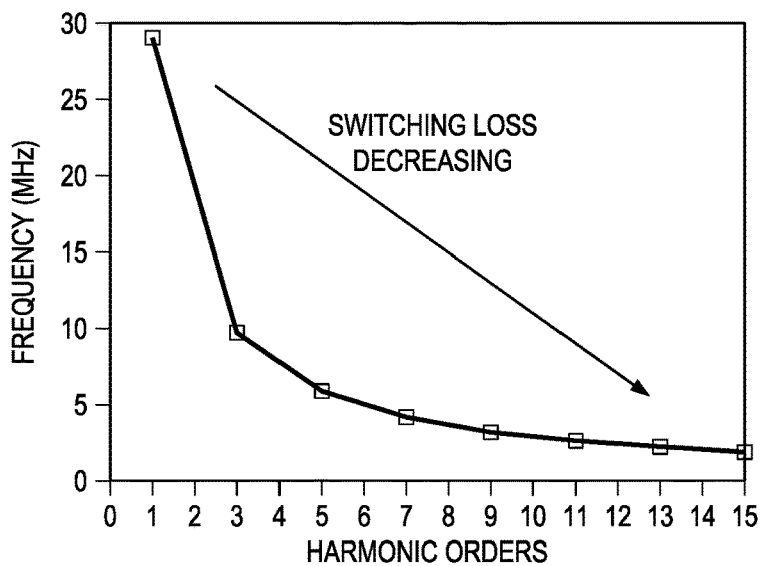
FIGS. 6A-C depict the sub-harmonic order as it relates to the switching frequency, power loss and efficiency of the circuit.
Figure 6B:
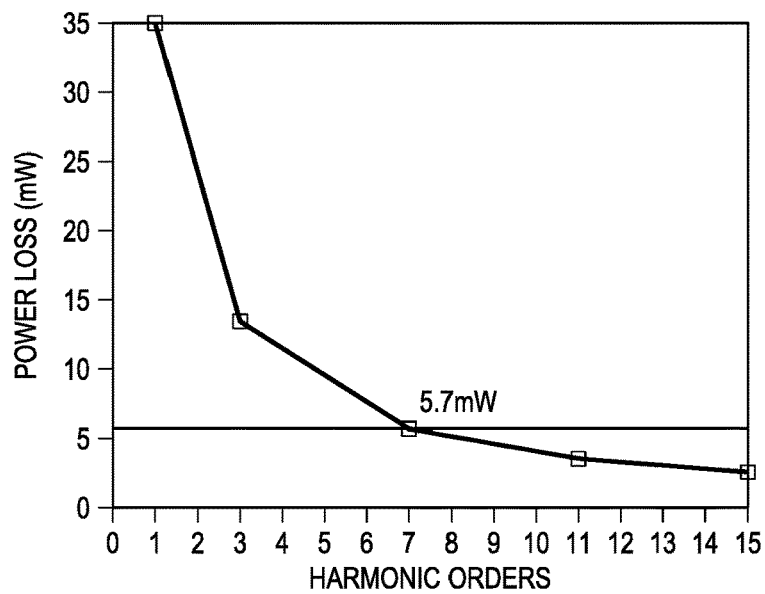
Figure 6C:
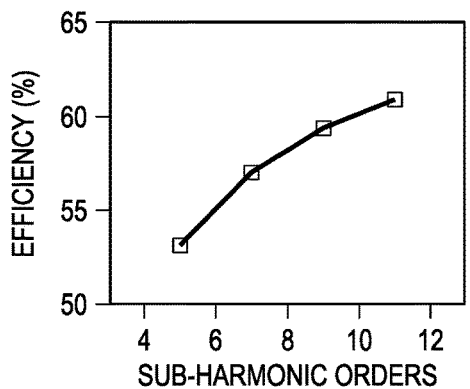
Figure 7A:
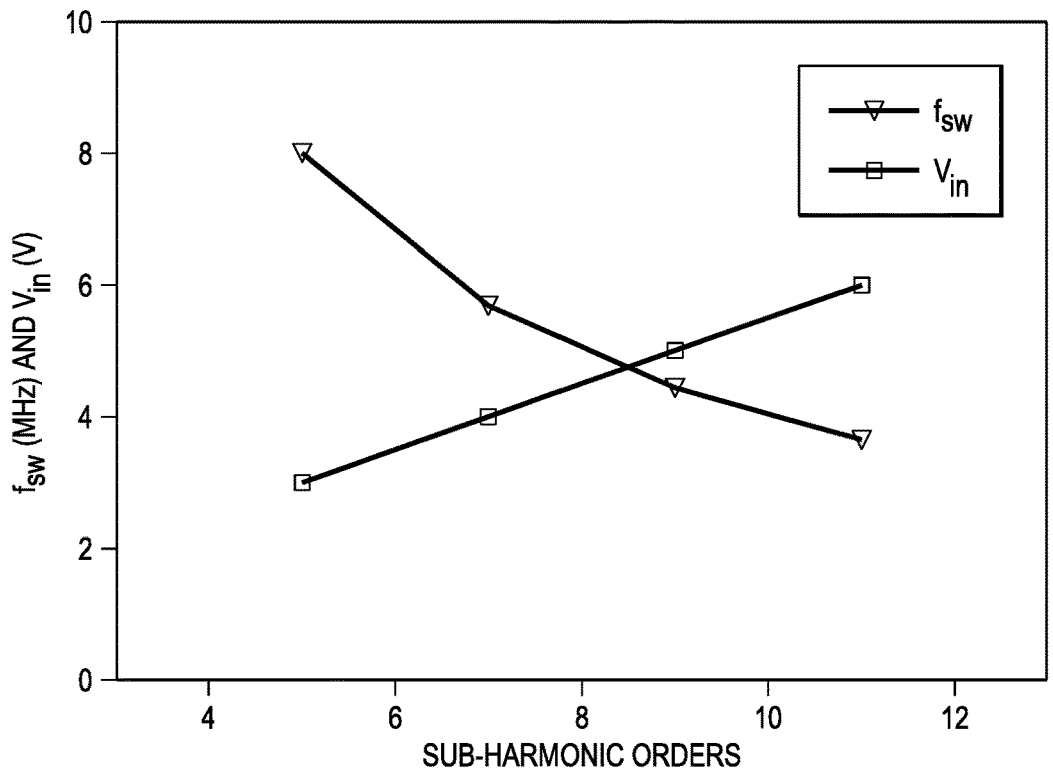
FIGS. 7A-B depict the effect of increasing the input voltage on the switching frequency and power loss in an example system according to an embodiment of the disclosure.
Figure 7B:
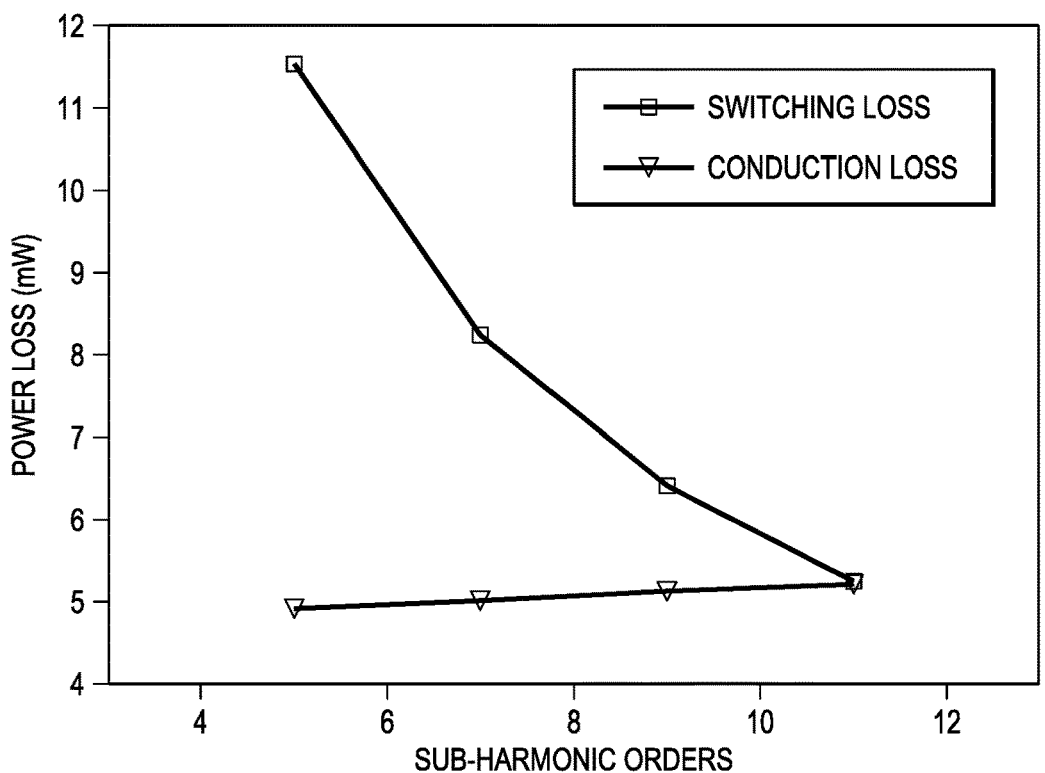

FIG. 6A illustrates a graph of frequency versus operation at various sub-harmonic orders for a particular resonant circuit designed with a resonant frequency of 29.4 MHz. In one embodiment, the inductance L=720 nH, series capacitance is Cs=10 pF due to area constraints, and parasitic capacitance Cp=33 pF. If the circuit is operated at the third harmonic, the switching frequency drops to just below 10 MHz, while at the fifth harmonic, the switching frequency is about 6 MHz. Further decreases in frequency are shown at the higher harmonic orders. Since higher order sub-harmonics require less switching, the switching loss decreases as the sub-harmonic order increases. FIG. 6B illustrates a related graph of power loss versus sub-harmonic order. As one moves from the fundamental frequency to the third, seventh, eleventh and fifteenth sub-harmonic orders, the power loss drops incrementally from 35 mW to about 13 mW, 5.7 mW, 3.75 mW and 2.5 mW respectively. FIG. 6C illustrates the efficiency gained in using the larger sub-harmonic orders. At the fifth sub-harmonic order, the efficiency is around 53%; at the seventh sub-harmonic order, the efficiency increases to around 57%; at the ninth sub-harmonic order, the efficiency is around 59%; and at the eleventh sub-harmonic order, the efficiency is about 61%. FIG. 7A illustrates the relationship between input voltage $V_{IN}$ and the sub-harmonic order at which the resonant circuit can operate while maintaining a constant power. As this graph demonstrates, as $V_{IN}$ increases, a lower switching frequency can be utilized while maintaining the output power. One skilled in the art will understand from this that if the sub-harmonic order is held constant, then a greater input voltage will provide an increase in output power. Applicant has realized that this relationship can be utilized in several ways. In at least one embodiment adjustments to the input power provide a means of fine tuning the circuit after a sub-harmonic order has been selected. In at least one embodiment, a larger increase in input power can allow the circuit to operate at a higher sub-harmonic order, providing additional savings in switching losses. The methods associated with these two embodiments will be discussed below. FIG. 7B is a final graph demonstrating the power loss due to both switching loss and conduction loss in the disclosed circuit. Conduction loss is the loss due to current circulating in the resonant circuit, while switching loss is attributable to a loss of power each time a switch is operated. It is clear from this graph that as the sub-harmonic order increases, the conduction loss rises very gradually, while the switching loss decreases significantly, making operation at a higher sub-harmonic order desirable whenever possible.

Figure 8:
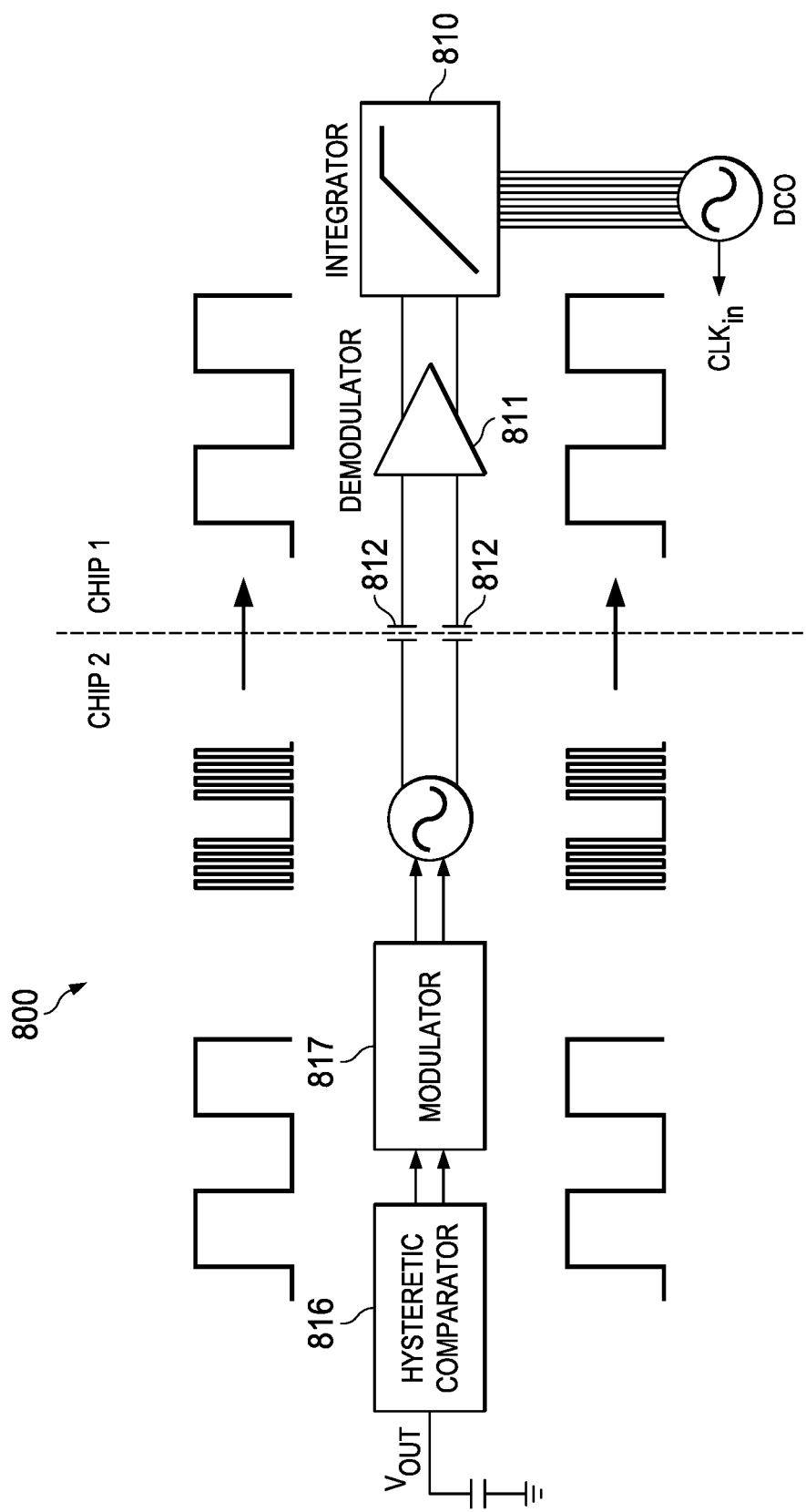
FIG. 8 depicts a feedback circuit for use with the power output stage according to an embodiment of the disclosure.

FIG. 8 discloses an example feedback circuit 800 for use with the disclosed capacitive power transfer. In at least one embodiment, the feedback is taken from the receiver chip rather than directly from the circuitry of the series resonance circuit. In this embodiment, Capacitors 812 provide isolation between the chip containing the power source (Chip 1) and the chip containing the receiver (Chip 2). By measuring the output voltage at the receiver, rather than on the output side, this circuit is able to provide an accurate picture of the actual operating voltage at the load and makes the circuit much more responsive to changes in the load. In the example shown, Hysteretic Comparator 816 receives the voltage $V_{OUT}$ experienced by the load and provides a square wave output to Modulator 817, which in turn provides a modulated alternating voltage to a first terminal of Capacitor 812. The second terminal of Capacitor 812 is connected to Demodulator 811, which provides a demodulated signal to Integrator 810. The output of Integrator 810 is used to adjust the digitally controlled oscillator (DCO) that provides a clock to the switching circuit, as well as to adjust the input voltage provided to the switching circuit (not specifically shown). Adjusting the DCO may include changing the sub-harmonic of the resonant frequency at which the DCO is operating or providing smaller adjustments to the frequency to fine-tune the operating frequency of the series resonance circuit.

Figure 9A:
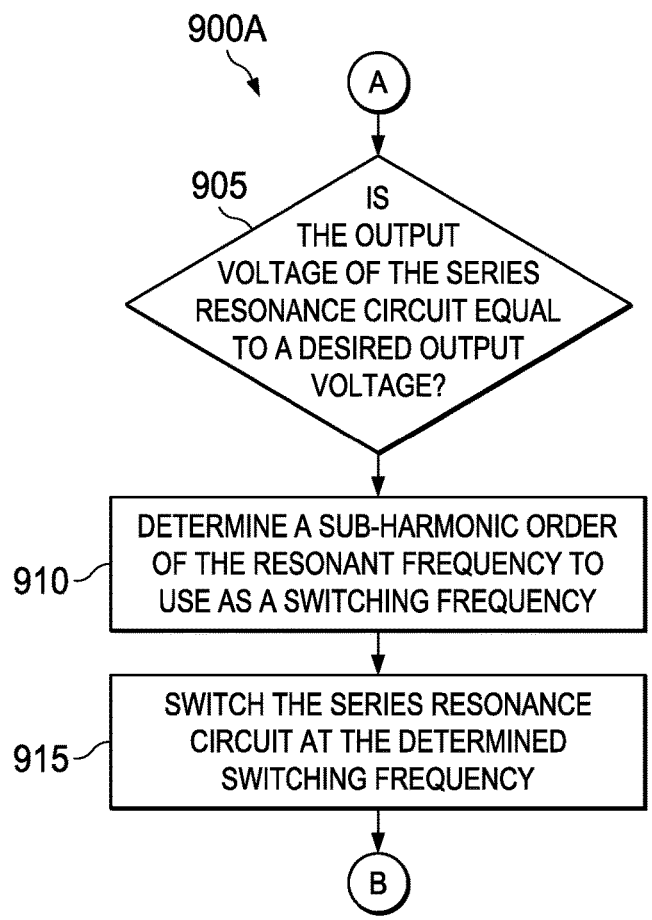
FIGS. 9A-B depict a method of providing isolated capacitive power transfer across a capacitor of a series resonance circuit according to an embodiment of the disclosure.
Figure 9B:
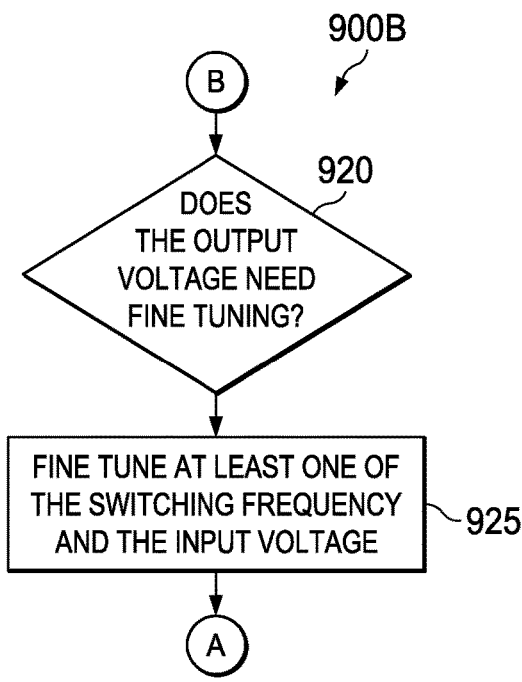

FIGS. 9A-B disclose a method 900 of providing isolated capacitive power transfer across a capacitor of a series resonance circuit according to an embodiment of the disclosure. In FIG. 9A, method 900A starts with determining (905) whether the output voltage of the series resonance circuit is equal to a desired output voltage. If the two voltages are equal, the method will continue to monitor the output voltage until action is needed. If the two voltages are not equal, then an adjustment needs to be made to either the sub-harmonic order of the resonant frequency that should be used as the switching frequency or the input voltage provided to the switching circuit. The method determines (910) the appropriate sub-harmonic order of the resonant frequency to use as the switching frequency. Note that if the voltage change is small, the current sub-harmonic order may still be appropriate, with only fine tuning of either the switching frequency or the input voltage needed. For larger voltage changes, a change to the sub-harmonic order may be necessary. Once the appropriate sub-harmonic order is determined, the method switches (915) the series resonance circuit at the determined switching frequency. In FIG. 9B, method 900B determines (920) whether the output voltage needs fine tuning. If the output does need fine tuning, the method fine tunes (925) at least one of the switching frequency and the input voltage.

Figure 10A:
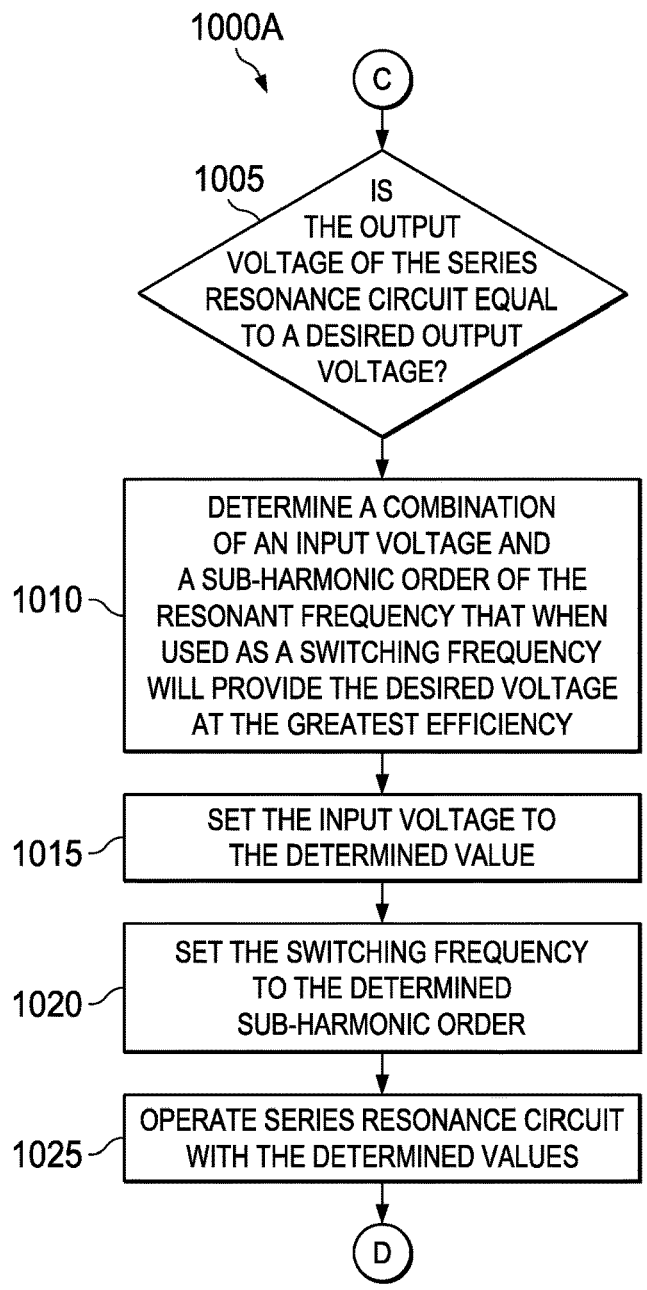
FIGS. 10A-10B depict a method of providing isolated capacitive power transfer across a capacitor of a series resonance circuit according to an embodiment of the disclosure.
Figure 10B:
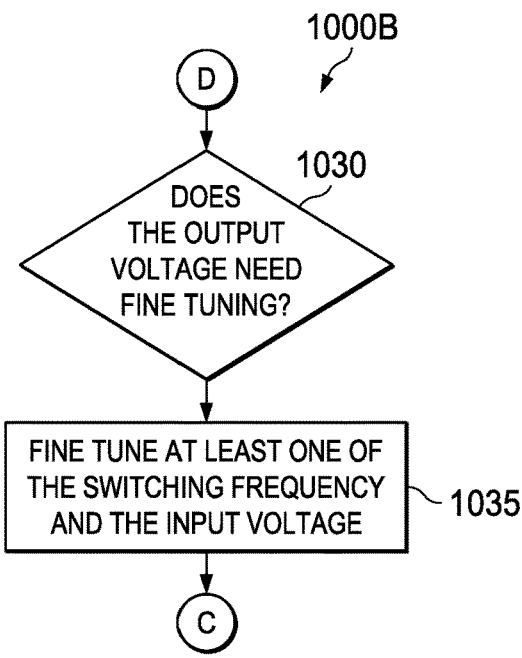

FIGS. 10A-B disclose a method 1000 of providing isolated capacitive power transfer across a capacitor of a series resonance circuit according to an alternate embodiment of the disclosure. In FIG. 10A, method 1000A starts with determining (1005) whether the output voltage of the series resonance circuit is equal to a desired output voltage. If the two voltages are equal, the method will continue to monitor the output voltage until action is needed. If the two voltages are not equal, the method determines (1010) a combination of an input voltage and a sub-harmonic order of the resonant frequency used as the switching frequency that will provide the desired power with the most efficiency. If the voltage change is small, the current combination may still be appropriate, with only fine tuning of either the switching frequency or the input voltage needed. For larger voltage changes, a change to the combination of input voltage and sub-harmonic order may be necessary. Once the appropriate sub-harmonic order is determined, the method sets the input voltage (1015) to the determined value and sets (1020) the switching frequency to the determined sub-harmonic order. The series resonance circuit is then operated (1025) with the determined values. In FIG. 10B, method 1000B determines (1030) whether the output voltage needs fine tuning. If the output does need fine tuning, the method fine tunes (1035) at least one of the switching frequency and the input voltage.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An electronic device comprising:
a clock having an output;
a first inductor having a first terminal and a second terminal, the second terminal of the first inductor adapted to be connected to a first terminal of a first capacitor;
a second inductor having a first terminal and a second terminal, the second terminal of the second inductor adapted to be connected to a first terminal of a second capacitor;
a first phase driver having an input and an output, the input of the first phase driver connected to the output of the clock, and the output of the first phase driver connected to the first terminal of the first inductor;
a second phase driver having an input and an output, the input of the second phase driver connected to the output of the clock, and the output of the second phrase driver connected to the first terminal of the second inductor.

2. The electronic device as recited in claim 1 further comprising a rectifier connected to a second terminal of the first capacitor and a second terminal of the second capacitor, the rectifier providing a rectified voltage to the low-power load.

3. The electronic device as recited in claim 2 further comprising a feedback circuit connected to change the sub-harmonic at which the switching circuit operates in response to a change in the low-power load.

4. The electronic device as recited in claim 3 wherein the feedback circuit receives voltage information across a feedback capacitor that has a smaller capacitance than the first capacitor.

5. The electronic device as recited in claim 4 further comprising a buck converter connected to provide an input voltage to the first phase driver.

6. The electronic device as recited in claim 5 wherein the feedback circuit is further connected to fine tune a frequency of a switched voltage.

7. The electronic device as recited in claim 6 wherein the feedback circuit is further connected to adjust the input voltage provided by the buck converter.

8. The electronic device as recited in claim 7 wherein the first capacitor is printed on top of a silicon chip containing the electronic device.

9. The electronic device as recited in claim 8 wherein the inductor is an external inductor.

10. The electronic device as recited in claim 9 wherein the feedback circuitry comprises:
a hysteretic comparator connected to receive the rectified voltage;
a modulator connected to receive the output from the hysteretic comparator and to provide a digital signal reflecting the rectified voltage to a first terminal of the feedback capacitor;
a demodulator connected to receive the digital signal on a second terminal of the feedback capacitor; and
an integrator connected to receive the output of the demodulator and to control a switching frequency and an input voltage of the first phase driver and the second phase driver.

* * * * *